United States Patent [19]
Garcia

[11] 3,716,830
[45] Feb. 13, 1973

[54] ELECTRONIC NOISE FILTER WITH HOSE REFLECTION SUPPRESSION

[75] Inventor: Donald J. Garcia, Houston, Tex.

[73] Assignee: Schlumberger Technology Corporation, New York, N.Y.

[22] Filed: Dec. 18, 1970

[21] Appl. No.: 99,441

[52] U.S. Cl. ........340/18 LD, 340/18 NC, 181/15 AP
[51] Int. Cl. ................................................G01v 1/36
[58] Field of Search......340/18 NC, 1 LD; 181/.5 AP

[56] References Cited

UNITED STATES PATENTS

| | | | |
|---|---|---|---|
| 3,555,504 | 1/1971 | Fields | 340/18 LD |
| 3,302,457 | 2/1967 | Mayes | 340/18 LD |
| 3,346,067 | 10/1967 | Schroeder | 181/.5 AP |
| 3,219,971 | 11/1965 | Cole | 340/15.5 R |

Primary Examiner—Benjamin A. Borchelt
Assistant Examiner—N. Moskowitz
Attorney—Ernest R. Archambeau, Jr., Stewart F. Moore, David L. Moseley, Edward M. Roney and William R. Sherman

[57] ABSTRACT

An illustrative embodiment of the present invention includes methods and apparatus for detecting pressure pulse signals from a remote signalling device in the mud line of a well while the well is being drilled and in the presence of mud pump pressure pulse noise. The apparatus and methods include placing plural pressure sensitive transducers in the mud line and at opposite ends of the flexible hose portion thereof between the metallic line from the mud pump and the rotary swivel portion which is attached to the kelly. Electrical transducer signals sensed on the mud pump end of the hose are processed to take into account the amplitude and phase shift effects of the hose and then delayed by a time sufficient for the pulse to traverse the hose. The processed signals are then combined with those from the second pressure transducer to directionally discriminate against the mud pump noise pulses while detecting pulses from downhole.

7 Claims, 2 Drawing Figures

PATENTED FEB 13 1973					3,716,830
FIG. 1
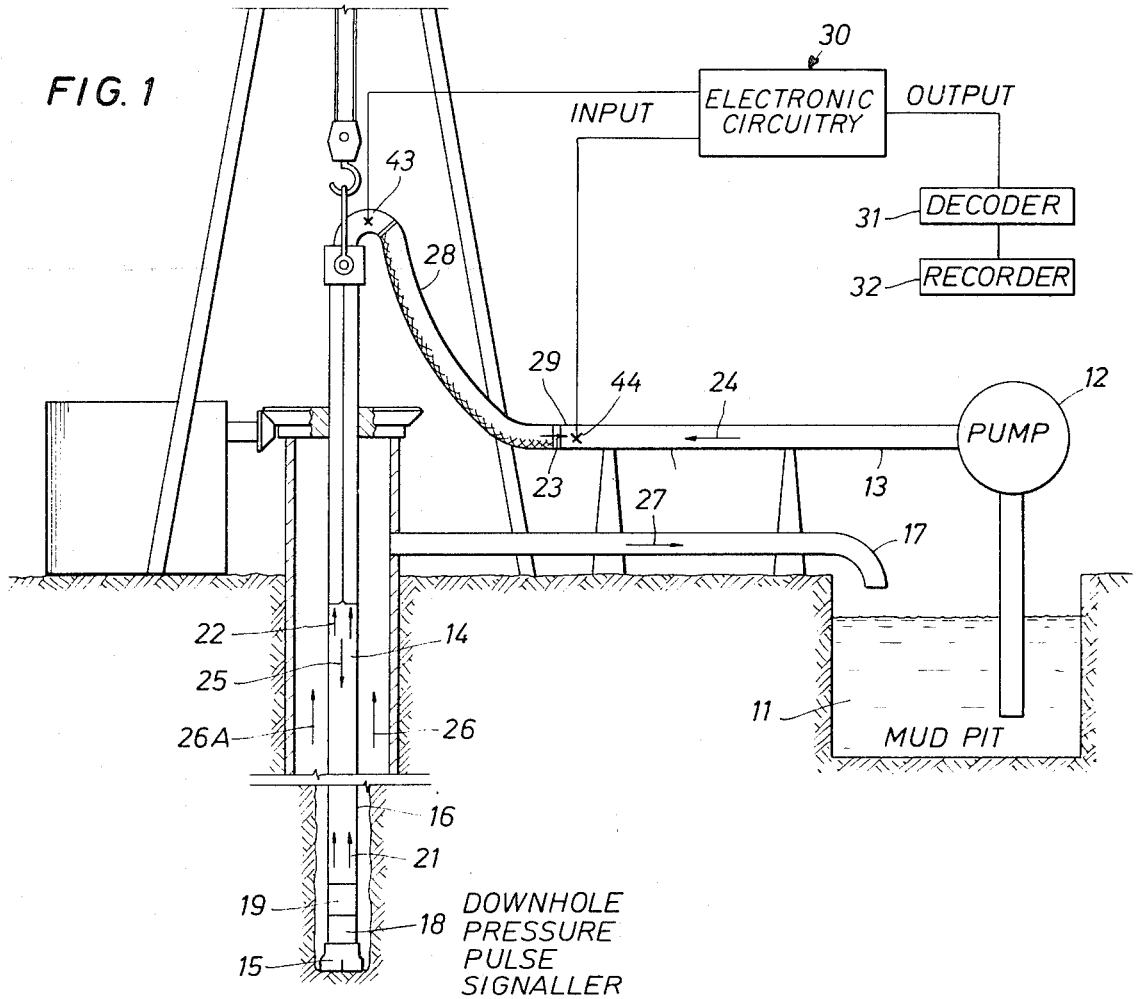
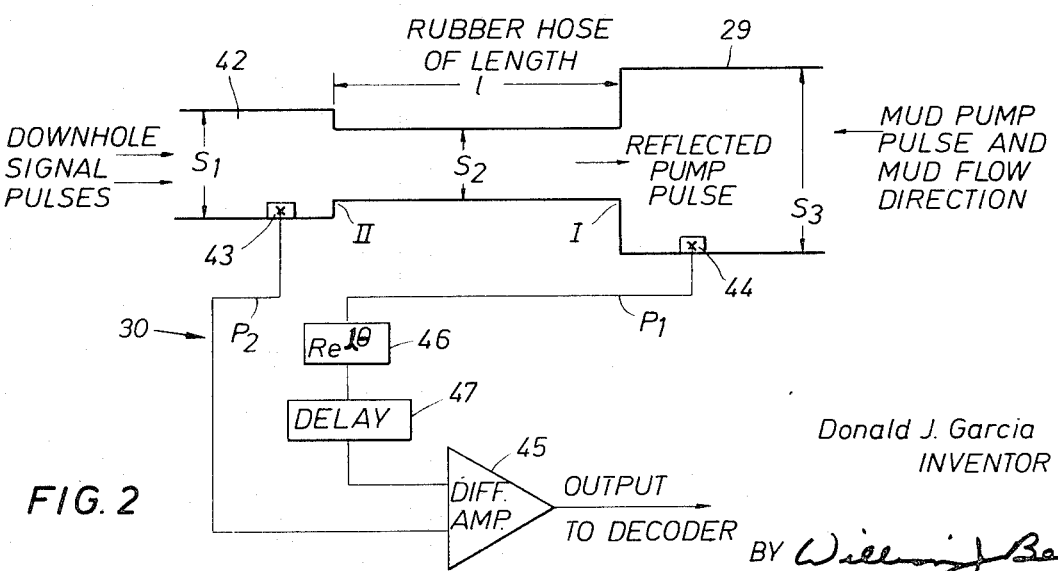
FIG. 2
Donald J. Garcia
INVENTOR
BY William J. Beard
ATTORNEY

3,716,830

ELECTRONIC NOISE FILTER WITH HOSE REFLECTION SUPPRESSION

BACKGROUND OF THE INVENTION

This invention relates to data transmission systems and more particularly to data transmission systems for use in transmitting data from the bottom of a well bore to the surface while drilling the well.

It has long been recognized in the oil industry that the obtaining of data from downhole during the drilling of a well would provide valuable information which would be of interest to the drilling operator. Such information as the true weight on the bit, the inclination of the borehole, fluid pressure and temperature at the bottom of the hole and the radioactivity of substances surrounding or being encountered by the drill bit would all be quantities of interest to the drilling operator. A number of prior art proposals to measure these data while drilling and to transmit information pertaining to such data to the surface have been made. Various transmission schemes have been proposed in the prior art for so doing. Among these prior art proposals has been the use of the drill pipe as an electrical conductor to transmit electrical signals to the surface, the transmission of sonic signals to the surface through the drill pipe, the release of radioactive or colored die markers in the circulating drilling fluid and several schemes of pressure pulse signalling in the drilling fluid. None of these prior art proposals has led to a practical solution of the transmission problem for various reasons.

Perhaps the most promising of these prior art suggestions in a practical sense has been that of signalling by pressure pulses in the drilling fluid. However, this approach has suffered the limitation of having a presence of a high ambient noise level in the signalling system because of pressure pulses introduced into the drilling fluid by the mud pumping system which is used to circulate drilling fluid. In a typical drilling arrangement, a large pump located at the surface is used to pump drilling mud down the drill stem through the bit and back to the surface by way of the annulus between the drill pipe and the wall of the well bore. Such pumps may typically will several hundred horsepower and will circulate drilling mud at a rate of 10 to 15 barrels per minute.

Typically, such pumps include large reciprocating pistons which produce pressure impulses in the mud line as the mud is forced down from the surface through the drill stem and into the well bore. These pressure impulses can interfere with the reception of relatively lower level pressure pulses from a downhole pressure pulse signalling system which is associated with the downhole measuring equipment in a measuring while drilling system.

Effective methods and apparatus such as disclosed in U.S. Pat. No. 3,488,629, which is assigned to the assignee of the present invention, have been used in the prior art to remove the pump pressure impulses from the system by cancellation of these pressure pulses based on a directionally discriminational filtering system. However, such filtering systems as disclosed in the above mentioned patent while effectively cancelling most of the large pressure pulses due to the mud pump have suffered slight limitations due to the discontinuities present in the mud circulation system. Sharp angled corners in the surface piping system used to supply mud from the pump to the rotary swivel or the use of a flexible portion of hose or the like ahead of the rotary swivel can cause reflection of a portion of the mud pump pulses back toward the pump.

Stating this problem from a slightly different viewpoint the different acoustic impedances of tubing used in various parts of the system can cause smaller amplitude acoustic reflections to appear in the system. For example, if the noise filter pressure input pickups are placed on the pump side of the flexible hose connection from the metallic tubing to the rotary swivel as disclosed in the above mentioned patent, then such reflections caused by the acoustic impedance mismatch between the flexible hose and the metal tubing can interfere with the detection of pressure pulses arriving from the downhole pressure signalling apparatus as sensed by a highly sensitive electronic system such as that used in the present invention.

Accordingly, it is an object of the present invention to provide improved noise filtering apparatus which takes into account the acoustic impedance mismatch at the interface between the metal tubing portion of the mud circulation system and the flexible hose which delivers the mud to the rotary swivel portion of the circulation system.

Another object of the present invention is to effectively suppress small transistory reflections caused by the acoustic impedance mismatch of the flexible hose portion of the mud circulatory system by improved pressure transducer placement and by accounting for the transistory reflections in the process of filtering the mud pump impulses.

Yet another object of the present invention is to provide improved noise filtering apparatus for effectively cancelling pump pressure impulses from the mud circulation system based on directional discrimination while accounting for small transistory reflections from the direction of the downhole portion of the system.

BRIEF DESCRIPTION OF THE INVENTION

In accordance with the objects of the present invention, an improved, a directionally discriminational pressure wave noise filter is supplied which effectively cancels the pressure pulse noise due to the mud pump and permits downhole pressure pulse signals from a measuring instrument to be detected at the surface while simultaneously suppressing pump pressure pulse reflections caused by the flexible mud line portion of the mud circulation system. Pressure sensitive transducers are placed on either side of the flexible mud hose portion of the mud circulation system according to the present invention. Due to the acoustic impedance mismatch between the flexible hose portion of the mud circulation system and the metal tubing portion, a small part of the pressure impulses due to the mud pump is reflected, for example, from the end of the flexible mud line nearest the pump back toward the pump. The pressure transducer in the mud circulation system nearest the pump senses both the direct pressure impulse due to the mud pump and the portion of such impulse which is reflected back in the direction of the mud pump. This causes an amplitude change and a phase shift in the pressure sensed by this transducer.

On the other hand, the pressure pickup at the end of the flexible hose portion of the system farthest from the mud pump sees only that portion of the mud pump pressure impulse which has traversed the flexible hose. This signal is seen an increment of time $\tau$ later than that seen at the first pressure pick-up. The amplitude is diminished and the relative phase of this pressure impulse is changed with respect to that of the same impulse sensed on the pump side due to the effect of the flexible hose. By properly combining the signals as detected at opposite ends of the flexible hose connection and taking into account the attenuation and phase shift caused by the flexible hose, the signals coming from the direction of the downhole signalling apparatus may be detected. The pump pressure impulses may be filtered from the system by directional discrimination; and reflections occurring at the interface and between the flexible hose and the metallic pipe portion of the system may be effectively eliminated by appropriate signal processing circuitry which takes into account the amplitude change and phase shift caused by the hose.

The novel features of the present invention are set forth with particularity in the appended claims. The present invention both as to its organization and manner of operation together with further objects and advantages thereof may best be understood by way of illustration and examples when taken in conjunction with the accompanying drawings in which:

BRIEF DESCRIPTION OF THE DRAWINGS

FIG. 1 is a schematic illustration showing the present invention in use in conjunction with a downhole pressure pulse signalling device; and FIG. 2 is a schematic illustration showing the present invention attached to the mud circulation system with pressure transducers located at either end of the flexible hose portion thereof.

DESCRIPTION OF THE PREFERRED EMBODIMENT

Referring now to FIG. 1, the operation of the present invention in a typical drilling arrangement is illustrated schematically. Drilling mud is picked up from mud pit 11 by mud pump 12. Mud pump 12 may be a pump of the reciprocating piston type. The mud is circulated through a mud line 13 containing a metallic pipe portion 29 and a flexible hose portion 28, down through the drill stem 14, through the bit 15 and back to the surface in the annulus 16 between the drill string and the wall of the well bore. Upon reaching the surface, the mud is discharged through line 17 into the mud pit 11 where cuttings of rock or other well debris are allowed to settle and to be further filtered before the mud is again picked up and recirculated by the pump 12.

A downhole pressure pulse signalling device 18 is attached to the drill stem for transmission of data signals derived during the drilling operation by a measurement instrument package 19. This package of measurement instruments may detect quantities of interest such as pressures, temperatures and flow rates of the mud in the portion of the borehole just above the bit during the drilling operation. The signalling device 18 may be of the valve or variable orifice type which generates pressure pulses in the drilling fluid by varying the speed of its flow or by momentarily stopping the flow. The measurement data may be encoded in a desired form by appropriate electronic means contained in the measurement instrument package 19 which, for example, may be powered by a downhole generator driven by the mud moving through an impeller type device or alternatively by downhole batteries. In any event, downhole pressure pulses generated by the signalling device 18 travel to the surface in the drill pipe and are represented by arrows 21, 22 and 23 in FIG. 1 which illustrate the path taken by such pressure pulses under typical well conditions. The mud pump 12 also produces pressure pulses which travel in the opposite direction in the mud line. These are illustrated by the arrows 24 and 25. The arrows 26 and 26a illustrate the return flow of the mud in the annulus between the drill stem and the wall of the borehole as previously discussed.

In order for the downhole pressure pulse signals to be discernible at the surface some means must be provided to detect these relatively lower pressure pulses and to effectively remove or cancel relatively larger pressure pulses due to the mud pump. Such a means has been disclosed previously in the earlier referenced U.S. patent. In this patent, a noise filter with two pressure pickups located on the pump side of the flexible drilling hose 28 of the mud circulation system is disclosed. This noise filter discriminated against pump pressure impulses by effectively cancelling such pulses based on the direction of travel in the mud line of such pulses. However, pump pressure impulses travelling down the metallic portion 29 of mud line 13, upon reaching the boundary between the flexible hose portion 28 and the metallic portion 29 of the line have a portion of their energy reflected back toward the mud pump. When a significant reflection occurs, a noise filter such as disclosed in the previously mentioned patent cannot differentiate such relatively low amplitude reflections from the relatively low level information bearing mud pulses from downhole such as illustrated by arrows 22 of FIG. 1. By the use of the present invention the mistaken detection of such reflections as information bearing signals may be effectively suppressed.

In the present invention, electronic circuitry 30 is coupled to a pressure transducer 44 located on the mud pump side of the flexible hose 28 and to a second pressure transducer 43 on the rotary swivel side of the mud line which is used to take into account the reflection at the discontinuity existing between the flexible hose 28 and the metallic portion 29 of the line 13. The electronic circuitry 30 takes into account the amplitude and phase shift introduced into pump pressure pulses as they traverse the flexible hose. This phenomenon effectively removes the reflected portion of such pump pulses impinging thereon. Output from the circuitry 30 is supplied to a decoding circuit 31 and thence to a recording or display apparatus 32 for interpretation by the drilling operator.

Referring now to FIG. 2, the length $l$ of rubber hose 28 disposed between the mud pump side of the drilling fluid line 29 and the drilling fluid line 42 is shown schematically. $S_1$ denotes the cross sectional area of the drilling fluid line 42 on the rotary swivel side. $S_2$ denotes the cross sectional area of the rubber hose 28 and $S_3$ denotes the cross sectional area of the drilling fluid line 29 on the mud pump side. Pressure transducers 43 and 44 are placed on opposite ends of the flexible hose the pressure pulse due to the mud pump (which is to be cancelled or removed) is assumed to be travelling from right to left. Also in FIG. 2, I represents the boundary on the right between the metallic portion of the mud line and the flexible hose and II represents the boundary on the left between the rubber hose and the portion of the mud line on the rotary swivel.

As the pressure pulse, which in actuality is a travelling acoustic wave, impinges on the boundary I, a portion of the wave will be transmitted through the rubber hose and a portion reflected back into the line 29 opposite to the original direction of travel. As may be found by reference to standard texts such as *Acoustics* by Stewart and Lindsay, published by D. Van Nostrand & Company, Third Edition, 1930, the displacement and pressure functions of this travelling acoustic wave or pressure pulse in the drilling fluid line at this boundary are given by:

$$\text{in } S_1 \begin{cases} U_{iI} = A_1 e^{i\omega t}, & P_{iI} = i\omega\rho C_1 A_1 e^{i\omega t} \\ U_{rI} = B_1 e^{i\omega t}, & P_{rI} = i\omega\rho C_1 B_1 e^{i\omega t} \end{cases} \quad (1)$$

$$\text{in } S_2 \begin{cases} U_{tI} = A_2 e^{i\omega t}, & P_{tI} = i\omega\rho C_2 A_2 e^{i\omega t} \\ U_{RI} = B_2 e^{i\omega t}, & P_{RI} = i\omega\rho C_2 B_2 e^{i\omega t} \end{cases} \quad (2)$$

where the U's represent the displacement functions and the P's represent the pressure functions as a function of time, $\tau$. The subscripts $i$ and $r$ in equations (1) represent incident and reflected waves in the tubing 42 of cross sectional area $S_1$ and the subscripts t and R in equation 2 represent the transmitted and reflected portion of the waves in the hose portion 28 of cross sectional area $S_2$. The $\omega$'s represent the angular frequency of the wave motion. The quantity $\rho$ represents the density of the drilling fluid in the mud line, $C_1$ is the speed of propagation of the waves in the pipe of cross sectional area $S_1$ and $C_2$ is the speed of propagation of the waves in the flexible hose portion having cross sectional area $S_2$. As usual, $e$ is equal to 2.718 .... (the Napierian logarithm base) and $i$ is the usual square root of minus 1. The indexed coefficients A and B represent arbitrary complex amplitude functions of the waves.

Similarily at the interface II, the displacement and pressure functions on opposite sides of the boundary are given by:

$$\text{in } S_2 \begin{cases} U_{iII} = A_2 e^{i(\omega t - kl)}, & P_{iII} = i\omega\rho C_2 A_2 e^{i(\omega t - kl)} \\ U_{rII} = B_2 e^{i(\omega t - kl)}, & P_{rII} = i\omega\rho C_2 B_2 e^{i(\omega t - kl)} \end{cases} \quad (3)$$

$$\text{in } S. \quad U_{tII} = A_3 e^{i\omega t}, \quad P_{tII} = i\omega\rho C_1 A_3 e^{i\omega t} \quad (4)$$

where again the subscripts $i$ and $r$ represent the incident and reflected waves on the right-hand side of boundary II in the flexible hose having cross sectional area $S_2$ and the subscript $t$ in equations 4 represents the transmitted wave on the left-hand side of boundary II in the metallic tubing having a cross sectional area $S_3$. Again the $\omega$'s represent the angular frequency and $k$ represents the wave number ($\omega/C$) of the travelling waves in the rubber hose of cross sectional area $S_2$.

The pressure and displacement functions must be continuous at the two interfaces in question. Applying these two conditions as boundary conditions, it is seen that:

$$C_1(A_1 + B_1) = C_2(A_2 + B_2) \quad (5)$$

$$S_1(A_1 - B_1) = S_2(A_2 - B_2) \quad (6)$$

at interface I and at interface II applying the pressure and displacement function continuity boundary conditions leads to the relations:

$$C_2(A_2 e^{-ikl} + B_2 e^{ikl}) = C_1 A_3 \quad (7)$$

$$S_2(A_2 e^{-ikl} - B_2 e^{ikl}) = S_3 A_3 \quad (8)$$

If we let $$M = S_2/S_1, \quad M_2 = S_3/S_2, \quad a = C_2/C_1 \quad (9)$$

and insert these into the boundary value equations (5), (6), (7) and (8), the following relationships result:

a) $A_1 = \frac{1}{2}[(M_1 + a)A_2 - (M_1 - a)B_2]$ b) $B_1 = \frac{1}{2}[(M_1 + a)B_2 - (M_1 - a)A_2]$ (10)

c) $A_2 = (1)/(2a) e^{ikl}(1 + aM_2) A_3$ d) $B_2 = (1)/(2a) e^{-ikl}(1 - aM_2) A_3$ It is seen that the flexible hose may be thought of as a medium which introduces a change in amplitude and a phase shift to pressure pulses entering from the right-hand side and travelling toward the left-hand side. For this to be the case, then the quantities which would be of interest to take into account are the phase shift and amplitude change introduced by the traversal of the pressure pulse through the flexible hose. The wave when it enters the downstream portion of the pipe 29 having cross sectional area $S_3$, may be thought of with respect to the incident wave as having a relationship of the form given by:

$$P_2(t) = Re^{i\theta} P_1(t - \tau) \quad (11)$$

where $P_2(t)$ represents the pressure sensed by pressure transducer 43 and FIG. 2 at time $t$ and $P_1(t - \tau)$ represents the pressure sensed by pressure transducer 44 at time $\tau$ earlier at that point. The quantity $R$ (i.e. the amplitude of the reflected wave with respect to the incident wave) may be derived from equations (10) by computing the modulus of the required amplitude ratio (i.e. $R = |A_3/(A_1 + B_1)|$). Similarly the phase shift introduced by the hose may be computed from equations (10). The relationships are found to be, by suitable algebraic manipulation, those given by:

$$R = \left|\frac{A_3}{A_1 + B_1}\right| = \frac{1}{[\cos^2(kl) + a^2 M_2^2 \sin^2(kl)]^{1/2}} \quad (12)$$

$$\theta = \tan^{-1}[-aM_2 \tan(kl)] \quad (13)$$

By knowing the relationship of amplitude and phase introduced into a pump pressure pulse traversing the rubber hose from transducer 44 to transducer 43, the electronic circuit 30 may be utilized to take into account the phase shift and amplitude change given by equations (12) and (13) in the manner shown in FIG. 2. The pressure measured at transducer 44 may then be appropriately corrected and combined with the pressure measured by transducer 43 in a differential amplifier 45 to cancel these pressure pulses produced by the mud pump while eliminating possible reflections caused by the flexible hose. To this end, the circuitry shown schematically as block 46 in FIG. 2 can be used to provide the corrections given by equation (12) and (13) to the pressure measured by transducer 44. Appropriate function forming circuitry as known in the art can be used for this purpose and need not be discussed in detail. The processed signal is then delayed by a delay line means 47 so that it is applied to the input of differential amplifier 45 simultaneously with the arrival of the corresponding mud pump pressure pulse at transducer 43.

By applying the signals caused by the mud pump pressure pulses simultaneously to the inputs of the differential amplifier 45 and by applying the amplitude and phase corrections given by equations (12) and (13) in the electronic circuits 46, the reflective effects of the flexible hose may be effectively removed and mud pump impulses effectively filtered from the drilling fluid line based on their direction of travel. Since this process has taken into account the reflection of pressure pulses at the boundary I and modifies the pressure sensed by transducer 44 accordingly, spurious detection of pulses due to such reflection are eliminated.

On the other hand, pressure pulses arriving from a downhole signalling device, such as 18 of FIG. 1, traverse the rubber hose in the opposite direction. These signals will be sensed by the pressure transducer 43 and immediately applied to the input of differential amplifier 45. At a time $2\tau$ later ($\tau$ being required to traverse the flexible hose) the same pressure pulse modified by the electronic circuits 46 and delay 47 will be applied to the opposite input of the differential amplifier. Thus a pulse arriving from downhole results in two pulse inputs to the terminals of differential amplifier 45 separated in time by $2\tau$ seconds. These two pulses may easily be decoded by appropriate decoding circuitry to indicate the arrival of a signal from the downhole signalling device.

Summarizing, the present invention includes methods and apparatus for effectively removing pressure pulse noise produced by the mud pump in a drilling fluid circulation system. Pressure sensitive transducers are placed on opposite ends of the flexible mud hose connecting the metallic portion of the mud line from the pump to the metallic portion of the mud line at the rotary swivel. A signal representative of the pressure as sensed on the pump side of the flexible hose is processed to take into account phase shift of amplitude differences introduced by the hose. This processed pressure pulse signal is then combined with a signal representative of pressure sensed on the opposite side of the hose a time $\tau$ later, to effectively cancel mud pump pressure impulses appearing in the system. Downhole pressure pulse signals arriving from a downhole signalling device arrive at terminals of the filter at time intervals separated by $2\tau$ seconds and are thus not imposed at the same time in the combining circuitry so that signals arriving from that direction may be detected.

The foregoing disclosure may make other alternative but equivalent embodiments of the present invention obvious to those skilled in the art. It is the intention of the appended claims to cover all such changes and modifications as come within the true spirit and scope of the present invention.

I claim:

1. A method for detecting information-conveying acoustic-frequency pressure signals being transmitted from within a well bore to the surface through a drilling fluid being pumped into said well bore through a tubular drill string coupled by at least one acoustically dissimilar tubular conduit to the discharge side of a drilling fluid pump producing spurious acoustic-frequency pressure signals which are transmitted through said drilling fluid toward said tubular conduit and said drill string, the method comprising the steps of:

detecting said pressure signals in said drilling fluid at a selected measuring point downstream of said tubular conduit for producing a first electrical signal substantially representative of the combination of said information-conveying upstream signals which have traveled through said drill string to said downstream measuring point and said spurious pressure signals which have traveled through said tubular conduit to said downstream measuring point;

detecting said spurious pressure signals in said drilling fluid at a selected measuring point upstream of said tubular conduit for producing a second electrical signal substantially representative of the combination at said upstream measuring point of said spurious pressure signals before they have traveled through said tubular conduit and spurious pressure signals reflected from said tubular conduit as a result of its acoustical dissimilarity;

attenuating and delaying said second electrical signal in accordance with the expected attenuation and delay of said spurious pressure signals which have traveled between said upstream and downstream measuring points through said tubular conduit for producing a compensated second electrical signal substantially representative of said spurious pressure signals which have traveled through said tubular conduit to said downstream measuring point; and combining said first electrical signal with said compensated second electrical signal for producing an electrical output signal substantially representative of only said information-conveying pressure signals at said downstream measuring point.

2. The method of claim 1 wherein said acoustically dissimilar tubular conduit is a flexible member including an elastomeric material.

3. The method of claim 1 wherein said attenuating and delaying step is performed by multiplying said second electrical signal by a function $Re^{i\theta}$, where R is the expected ratio of the amplitudes of said spurious pressure signals at said upstream and downstream measuring points respectively, and $\theta$ is the expected phase shift introduced by said tubular conduit on said spurious pressure signals traveling through said tubular conduit between said upstream and downstream measuring points.

4. Apparatus adapted for detecting information-conveying acoustic-frequency pressure signals being transmitted from within a well bore to the surface through a drilling fluid being pumped into the well bore through a tubular drill string coupled by at least one acoustically dissimilar tubular conduit to the discharge side of a drilling fluid pump which produces spurious acoustic-frequency pressure signals that are transmitted through the drilling fluid toward the tubular conduit and the drill string, and comprising:

first pressure-detecting means adapted for producing a first electrical signal substantially representative of the combination of said information-conveying pressure signals at a selected measuring point adjacent to the downstream end of such a tubular conduit and said spurious pressure signals which have traveled therethrough to said selected downstream measuring point;

second pressure-detecting means adapted for producing a second electrical signal substantially representative of the combination of said spurious pressure signals at a selected measuring point adjacent to the upstream end of such a tubular conduit and reflections therefrom as a result of said acoustic impedance mismatch;

circuit means coupled to said second pressure-detecting means and adapted for attenuating and delaying said second electrical signal in accordance with the expected attenuation and delay provided by such a tubular conduit upon said spurious pressure signals traveling therethrough between said upstream and downstream measuring points to provide a compensated second electrical signal substantially representative of said spurious pressure signals detected at said downstream measuring points by said first pressure-detecting means; and output means responsive to said first electrical signal and said compensated second electrical signal and adapted for producing an electrical output signal substantially representative of only said information-conveying pressure signals at said downstream measuring point.

5. The apparatus of claim 4 wherein said output means include a differential amplifier adapted for receiving said first electrical signal and said compensated second electrical signal to produce said electrical output signal.

6. The apparatus of claim 4 wherein said circuit means include electrical means for generating said compensated second electrical signal as a function of the product of said second electrical signal and a constant $Re^i$, where $R$ is the expected ratio of said spurious pressure signals respectively detected by said first and second pressure-detecting means, and $\theta$ is the expected phase difference between said spurious pressure signals respectively detected by said first and second pressure-detecting means.

7. The apparatus of claim 6 wherein said output means include a differential amplifier adapted for receiving said first electrical signal and said compensated second electrical signal to produce said electrical output signal.

* * * * *